United States Patent [19]

de Graff et al.

[11] 4,455,034
[45] Jun. 19, 1984

[54] TRANSPORT DEVICE FOR PULL-TYPE SWATHERS AND THE LIKE

[75] Inventors: Peter de Graff; Donald Schweitz, both of Winnipeg, Canada

[73] Assignee: Canadian Co-Operative Implements Limited, Winnipeg, Canada

[21] Appl. No.: 408,240

[22] Filed: Aug. 16, 1982

[51] Int. Cl.³ .............................................. B60D 1/14
[52] U.S. Cl. .................... 280/415 R; 56/228; 172/679; 280/462; 280/476 R
[58] Field of Search ........... 280/415 R, 411 R, 411 A, 280/412, 413, 456 A, 462, 491 R, 491 B, 476 R, 476 A; 172/248, 625, 679, 311; 56/228, 385

[56] References Cited
U.S. PATENT DOCUMENTS

| | | | |
|---|---|---|---|
| 2,532,164 | 11/1950 | Hansen et al. | 56/228 |
| 3,015,499 | 1/1962 | Lely et al. | 280/456 A |
| 3,279,158 | 10/1966 | Kirkpatrick et al. | 56/228 |
| 3,457,709 | 7/1969 | Killbery et al. | 56/228 |
| 3,751,891 | 8/1973 | Molzahn et al. | 56/228 |
| 4,162,085 | 7/1979 | Miranowski | 280/412 |

*Primary Examiner*—David M. Mitchell
*Assistant Examiner*—D. Lynn Fugate
*Attorney, Agent, or Firm*—Stanley G. Ade

[57] ABSTRACT

A hitch and pivot frame are pivotally attached to a main frame of a pull-type swather and a main or inner wheel is attached to the pivot frame. By removal or unlatching of a restraining device, the pivot frame can pivot with the wheel, through approximately 90° and into a transport position without unhooking the tractor. The outer wheel is moved into the transport position by manual means in a conventional manner. The main or inner wheel can be in a cambered position or in a toed-out position depending upon field conditions.

18 Claims, 6 Drawing Figures

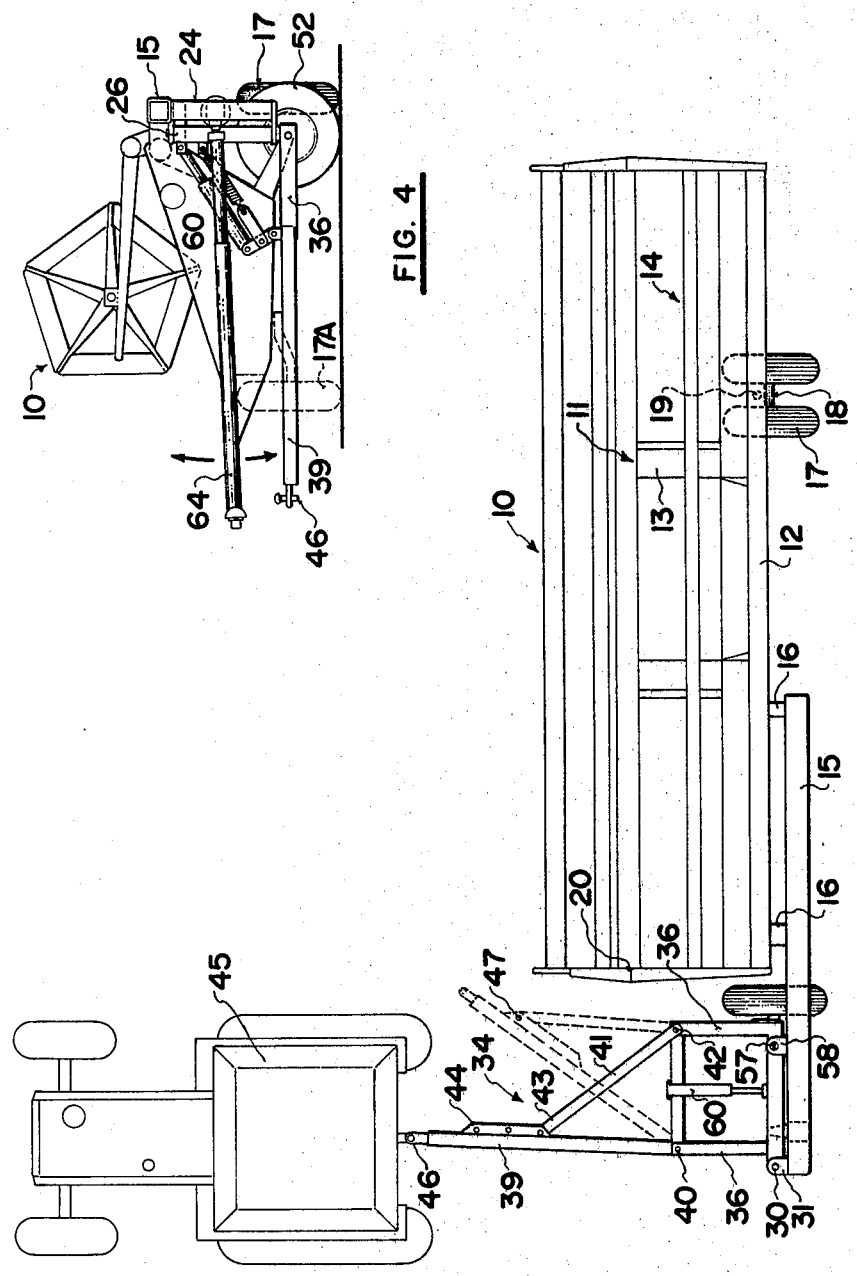

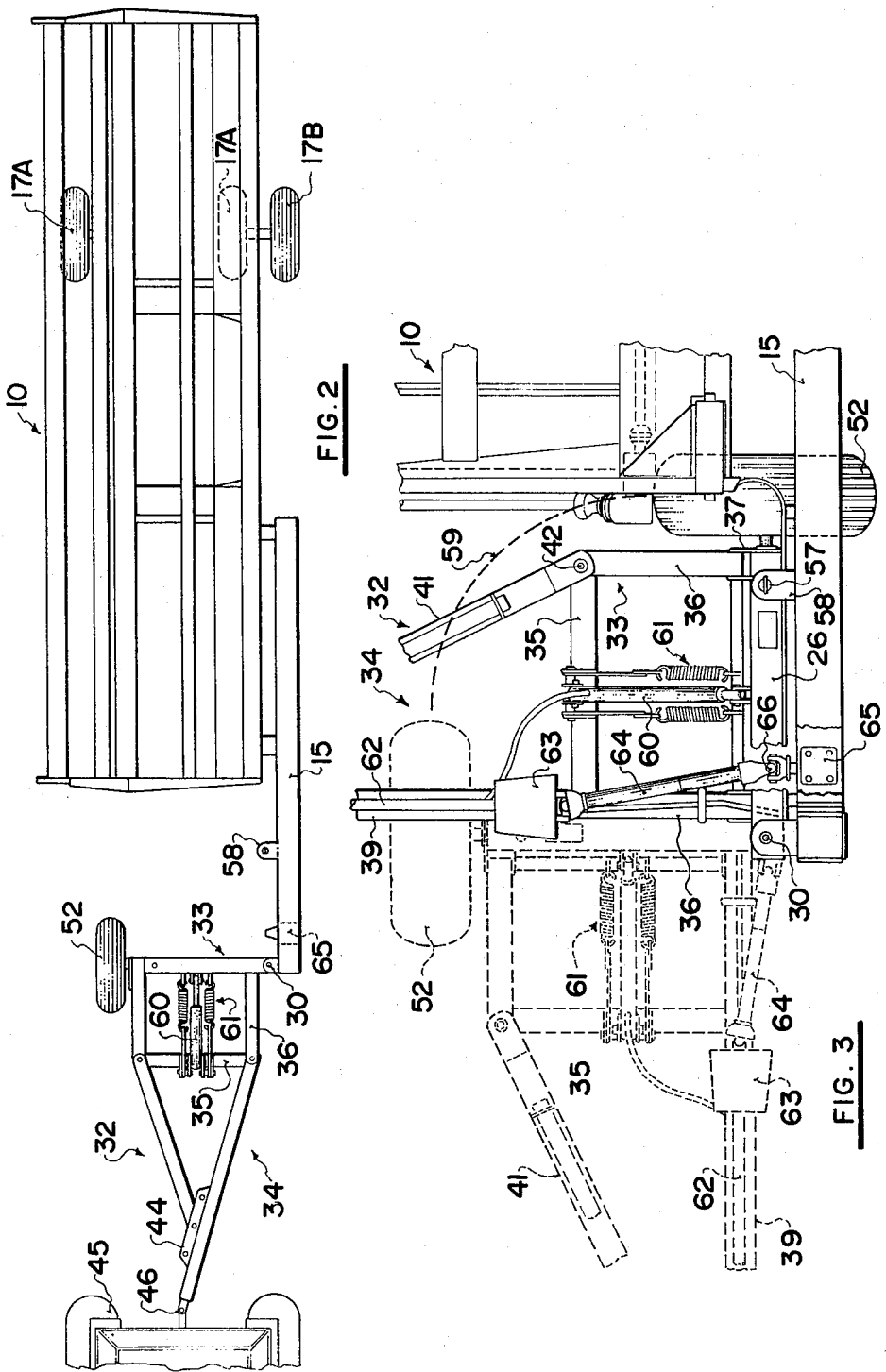

TRANSPORT DEVICE FOR PULL-TYPE SWATHERS AND THE LIKE

BACKGROUND OF THE INVENTION

This invention relates to new and useful improvements in transport assemblies for implements such as pull-type swathers or the like. When pull-type swathers are relatively narrow in width, they can be pulled straight ahead but when the width becomes larger than the road allowance permitted, then other means have to be provided.

One method is to unhitch the tractor from the swather and reattach same to a further hitch assembly situated on one end of the swather whereupon, after the wheels are unlocked, it may be pulled endwise but this requires two hitch pole assemblies one of which has to be elevated and locked in an inoperative position and also requires the unhitching and then rehitching of the tractor all of which is time consuming and adds to the cost of the implement.

SUMMARY OF THE INVENTION

The present invention overcomes these disadvantages by providing means whereby the implement may be moved from a field position, to a semi-transport position or to a full transport position all of which without disconnecting the tractor from the implement and utilizing a common hitch pole assembly.

In accordance with the invention there is provided an assembly for implements such as pull-type swathers and the like which includes a main frame movable from a field position to a transport position and vice versa; comprising in combination a pivot frame pivotally connected to the main frame of the implement, a hitch assembly extending from said pivot frame and being pivotally connected thereto for movement in a vertical plane and means to detachably lock said pivot frame to said main frame when in the field position, said pivot frame swinging substantially horizontally through approximately 90° when said means to detachably lock said pivot frame is released.

In accordance with another aspect of the invention, there is provided a pull-type swather assembly comprising in a combination a main frame movable from a field position to a transport position and vice versa, a pivot frame pivotally connected to said main frame of said swather, a hitch assembly extending from said pivot frame and being pivotally connected thereto for movement in a vertical plane and means to detachably lock said pivot frame to said main frame when in the field position, said pivot frame swinging substantially horizontally through approximately 90° when said means to detachably lock said pivot frame is released.

Another advantage of the present invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a partially schematic top plan view of a pull-type swather secured to a tractor and shown in the field position with the hitch pole assembly shown in phantom in a semi-transport position.

FIG. 2 is a view similar to FIG. 1 but showing the hitch pole assembly and tractor, together with the swather in the full transport position.

FIG. 3 is an enlarged fragmentary plan view of the pivot frame assembly, part of the hitch pole assembly and part of the swather shown in full line in the field position and with the hitch pole assembly shown in phantom in the transport position.

FIG. 4 is an end view of FIG. 1 with the tractor removed for clarity.

In the drawings like characters of reference indicate corresponding parts in the different figures.

DETAILED DESCRIPTION

Figure 5:
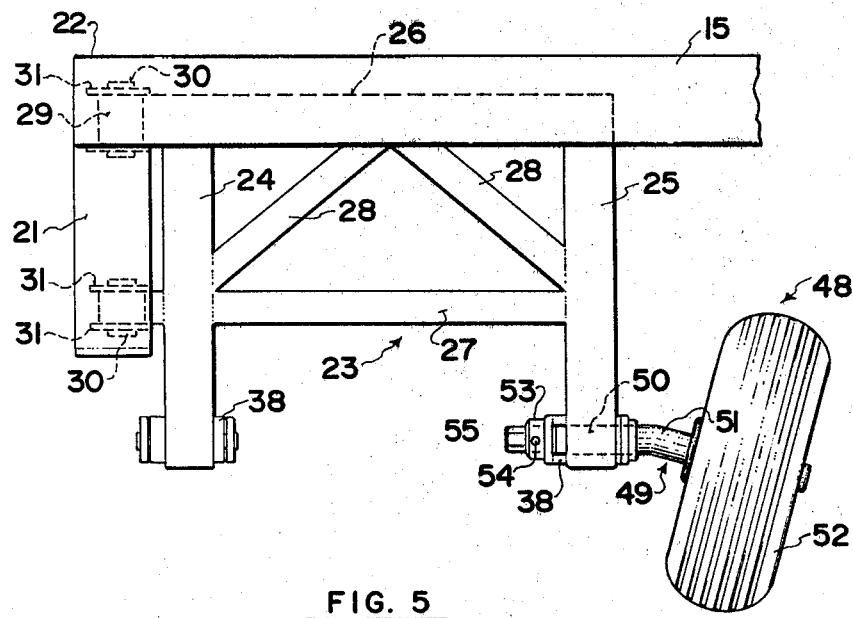
FIG. 5 is an enlarged fragmentary rear view of part of the main frame, the pivot frame and the main wheel assembly in the cambered position.

Proceeding therefore to describe the invention in detail, reference should first be made to FIGS. 1 and 2 in which reference character 10 illustrates in general, a pull-type swather of relatively conventional construction including a front frame member 11, a rear frame member 12, transverse support members 13 and a reel assembly collectively designated 14 all of which are conventional. A main frame member 15 is connected to the rear member 12 by members 16, and adjacent one end of the frame member 12 as clearly shown.

When in the field position illustrated in FIG. 1 a pair of ground engaging wheels 17 mounted to a member 18, are pivotally connected to the rear frame member 12 by means of pivot pin 19 and these are pinned into the position shown in FIG. 1. They can also be attached to an extended frame member 15.

However when moved to the transport position shown in FIG. 2, one of the wheels specifically designated 17A is removed, the remaining wheel specifically designated 17B is rotated through 90° and is locked in position by conventional means and the wheel 17A is detachably mounted to the front frame member 11 and locked in position parallel to wheel 17B as clearly shown. The wheels 17A and 17B do not form part of the invention as such and are included for explanatory purposes only.

The main frame member 15 extends beyond one end 20 of the pull-type swather 10 and terminates in a vertical hinge member 21 which extends downwardly from the outer end 22 of the main frame member 15. This is shown in detail in FIGS. 5 and 6.

A sub or pivot frame collectively designated 23 includes a pair of spaced and parallel vertical members 24 and 25 which extends downwardly from a horizontal upper frame member 26 and are braced by cross member 27 and diagonal members 28. Members 26 and 27 terminate in bearing sleeves 29 one above the other as clearly shown in FIGS. 5 and 6 and pivot pins 30 engage these bearing sleeves with pairs of spaced and parallel horizontally situated plates 31 which extend forwardly from the end 22 of the main beam and the vertical hinge member 21 as clearly illustrated. This pivots the pivot frame by one end thereof for horizontal movement around the vertical axis defined by the vertically situated pivot pins 30.

A hitch pole assembly shown in more detail in FIG. 3 is provided collectively designated 32. It comprises a substantially rectangular frame portion collectively designated 33 and a forwardly extending hitch portion collectively designated 34. The rectangular frame portion 33 includes a front transverse member 35, and spaced and parallel side members 36. These members 36 are pivotally secured by means of spaced and parallel pairs of plates 37. Two transverse bearing supports 38 are situated in the distal or lower ends of the vertical members 24 and 25 of the pivot frame 23 so that the rectangular frame together with the hitch assembly 34 may be moved in a vertical plane pivoting around the horizontal axis extending between the bearings 38.

The portion 34 of the hitch assembly includes a main hitch pole 39 pivoted by one end thereof adjacent the junction of one of the rectangular frame members 36 and the transverse member 35, reference character 40 indicating the vertical pivot. A diagonal member 41 is pivotally connected by means of pivot pin 42, to adjacent the junction of the other of the members 36 of the rectangular frame and the transverse member 35 and this extends diagonally forwardly to be mounted by the other end 43 thereof for sliding movement within a sliding bracket 44 on the inner side of the forward portion of the hitch pole 39. The hitch pole is in turn connected to a tractor 45 by means of hitch pin 46 which is conventional.

The portion 34 is normally in the position shown in solid line when the assembly is in the field position or in the full transport position but it may be moved to the position shown in phantom in FIG. 1, which is a partial or semi-transport position if the width of the swather is not too great. It may be locked in either of the positions shown in full line or dotted line in FIG. 1 by means of a pin 47.

Figure 6:
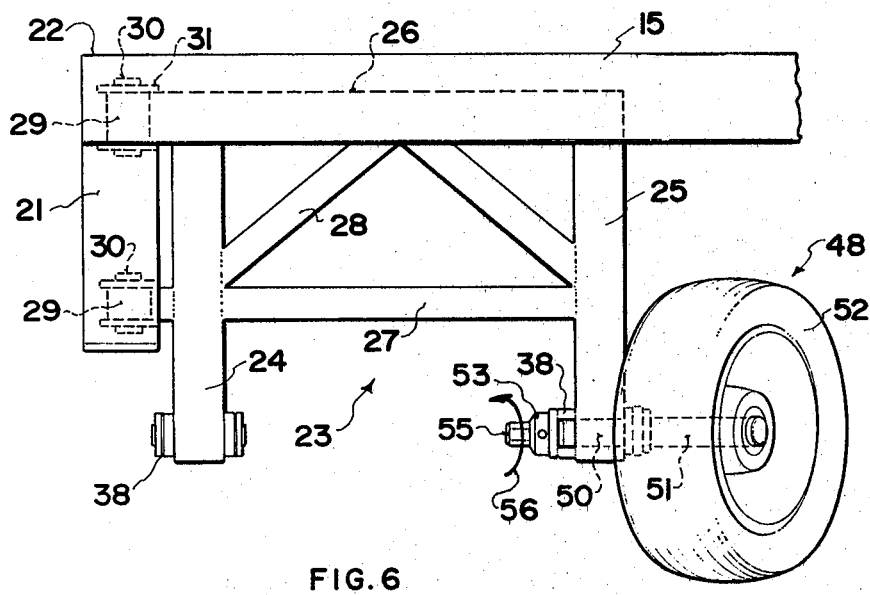
FIG. 6 is a view similar to FIG. 5 but showing the main wheel assembly in the toed-out position.

A main or inner wheel assembly supports the pivot frame and hitch assembly at the rear thereof as well as supporting the inner end of the swather unit 10. Details of this main wheel assembly are shown in FIGS. 5 and 6 with the main wheel assembly being designated generally by reference character 48. It consists of a spindle collectively designated 49 having a support portion 50 extending through bearing support 38 at the lower end of the vertical member 25 of the pivot frame. An angulated wheel support portion 51 extends from one end of the support portion 50 and the main or inner wheel 52 is journalled for rotation upon this portion 51. The support portion 50 of the spindle is locked in one of two positions by means of a nut and bolt assembly 53 extending through the portion 50 and through a fixed collar 54 and the inner end of the support portion 50 of the spindle is provided with a hexagon shaped portion 55 for engagement with a wrench or the like.

When in the position shown in FIG. 5, the wheel 52 is in a cambered position due to the fact that the portion 51 of the spindle inclines downwardly from the portion 50. This is the position used when the swather is in the field position and being used on a level field or when the swather is in the transport position.

However by removing the nut and bolt assembly 53, and rotating the spindle in the direction of arrow 56, through approximately 90°, the wheel is moved to the position shown in FIG. 6 which is a "toed-out" position used on sloping fields. The hexagonal end 55 may be used to rotate the spindle from one position to the other and vice versa and when in the toed-out position illustrated in FIG. 6, the nut and bolt assembly 53 is replaced through a further aperture within the spindle portion 50 thus locking it in this position.

Means are provided to move the hitch assembly 32 and the pivot frame assembly 23 from the field position shown in FIG. 1 to the transport position shown in FIG. 2, without the necessity of disconnecting the tractor 45, it being understood that when in the position shown in FIG. 2, it is in the full transport position.

Said means includes the aforementioned vertical pivot connection through pivot pins 30 of the pivot frame to the main frame. When in the field position, a transport pin 57 engages through a pair of lugs 58 extending forwardly from the main frame 15 and through an aperture within the member 26 of the pivot frame 23 thus locking the assembly in the field position. When it is desired to move to the full transport position, this pin is removed and the tractor is driven to the left with respect to FIG. 1 until the hitch assembly takes up the position shown in phantom in FIG. 3 and in full line in FIG. 2. With the wheels moved to the position shown in FIG. 2 as hereinbefore described, the assembly is in the full transport position. As the hitch frame and pivot frame move from the field position to the full transport position and vice versa, the main wheel 52, which is in the cambered position shown in FIG. 5, for this function, tracks through approximately 90° indicated by the dotted line 59.

A hydraulic ram assembly 60 extends between the upper member 26 of the pivot frame 23 and the lower transverse member 35 of the rectangular hitch frame portion 33 and is operatively connected to the hydraulic system of the tractor (not illustrated). When in the field position shown in FIGS. 1 and 3, extension and retraction of this ram assembly pivots the pivot frame and hence the main member 15 and the swather around the pivotal connection of the pivot frame to the rear side of the rectangular frame 33. Also, heavy-duty spring assemblies 61 extend between the hinged cylinder mount attached to frame members 35 and the frame member 26 and permit the swather assembly to float when in the field position. Both the ram assembly 60 and the spring assemblies 61 are allowed to float when the assembly is moved to the full transport position.

A power takeoff shaft 62 extends from the power takeoff of the tractor, through a gear box 63 and via a telescopic drive shaft 64 to a gear box 65 on the main frame member 15. From there it operatively extends to the swather for rotating the reel assembly, cutter bar and the like. However this connection is conventional and is not shown in the drawings.

When the assembly is moved from the field position to the full transport position, the drive shaft 64 is disconnected at the rear end 65 thereof and is then supported within a bracket 66 extending from adjacent the end 22 of the main shaft and shown in phantom in FIG. 3.

It will therefore be appreciated that a relatively simple connection is made between the tractor and the pull-type swather enabling the swather to be moved to a semitransport position shown in phantom in FIG. 1 or to a full transport position shown in phantom in FIG. 3 and in full line in FIG. 2 without the necessity of disconnecting the tractor from the unit.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not a limiting sense.

We claim:

1. A pull-type field working farm implement which includes a main frame movable from a field position to a transport position and vice versa; comprising in combination a pivot frame pivotally connected to the main frame of the implement, a hitch assembly extending from said pivot frame and being pivotally connected thereto for movement in a vertical plane and means to detachably lock said pivot frame to said main frame when in the field position, said pivot frame swinging substantially horizontally through approximately 90° when said means to detachably lock said pivot frame is released, said main frame including a substantially horizontal main member and a vertical hinge member at one end thereof, said pivot frame including a substantially vertical frame component, vertically situated hinges connected at one end of said frame component hingedly connecting to said vertical hinge member of said main frame around a substantially vertical axis, said vertical frame component including a pair of horizontal and horizontally spaced bearing means, said hitch assembly being pivotally connected to said bearing means.

2. The assembly according to claim 1 in which said pivot frame component is rectangular and wherein said vertical frame component includes a pair of spaced and parallel substantially vertical members, said bearing means being mounted within the lower ends of said member.

3. The assembly according to claim 1 in which said means to detachably lock said pivot frame to said main frame in a field position includes a lock pin operatively connectable between said horizontal main member and said vertical frame component.

4. The assembly according to claim 1 which includes a main wheel, axle means on which said wheel is journalled for rotation about an axis, said axle means being fixed to said pivot frame at a position remote from the pivotal connection thereof to said main frame, whereby rotation of said pivot frame through said angle of 90° causes the axle of said wheel to turn through 90° and to move transversely relative to said main frame.

5. The assembly according to claim 4, including a working implement mounted on the main frame, wherein in the field position said main wheel is positioned at the rear of said main frame to support said main frame and wherein in the transport position the main wheel is moved forwardly and turned through 90° so as to take up a position at the front of the main frame and intermediate the width of the implement.

6. The assembly according to claim 3 which includes a main wheel, axle means on which said wheel is journalled for rotation about an axis, said axle means being fixed to said pivot frame at a position remote from the pivotal connection thereof to said main frame, whereby rotation of said pivot frame through said angle of 90° causes the axle of said wheel to turn through 90° and to move transversely relative to said main frame.

7. The assembly according to claim 4 in which said axle means to mount said main wheel to said pivot frame includes a spindle, said spindle having a support portion extending horizontally from said pivot frame and a wheel mounting portion angulated with respect to said support portion, said main wheel being journalled for rotation upon said wheel mounting portion, said support portion being selectively rotatable within said main frame through approximately 90° from a main wheel cambered position to a main wheel toed-out position and vice versa and means to selectively lock said spindle in either said positions.

8. The assembly according to claim 5 in which said axle means to mount said main wheel to said pivot frame includes a spindle, said spindle having a support portion extending horizontally from said pivot frame and a wheel mounting portion angulated with respect to said support portion, said main wheel being journalled for rotation upon said wheel mounting portion, said support portion being selectively rotatable within said main frame through approximately 90° from a main wheel cambered position to a main wheel toed-out position and vice versa and means to selectively lock said spindle in either said positions.

9. The assembly according to claim 6 in which said axle means to mount said main wheel to said pivot frame includes a spindle, said spindle having a support portion extending horizontally from said pivot frame and a wheel mounting portion angulated with respect to said support portion, said main wheel being journalled for rotation upon said wheel mounting portion, said support portion being selectively rotatable within said main frame through approximately 90° from a main wheel cambered position to a main wheel toed-out position and vice versa and means to selectively lock said spindle in either said positions.

10. The assembly according to claims 1, 2 or 3 includes a ram assembly operatively connected between said hitch assembly and said pivot frame whereby, when said assembly is in the field position, extension and retraction of said ram assembly rotates said main frame and hence said implement around the pivotal connection between said hitch assembly and said pivot frame, and spring means also operatively extending between said hitch frame and said pivot frame whereby said implement is in floating relationship with said hitch assembly.

11. The assembly according to claims 4, 5 or 6 includes a ram assembly operatively connected between said hitch assembly and said pivot frame whereby, when said assembly is in the field position, extension and retraction of said ram assembly rotates said main frame and hence said implement around the pivotal connection between said hitch assembly and said pivot frame, and spring means also operatively extending between said hitch frame and said pivot frame whereby said implement is in floating relationship with said hitch assembly.

12. The assembly according to claims 7, 8 or 9 includes a ram assembly operatively connected between said hitch assembly and said pivot frame whereby, when said assembly is in the field position, extension and retraction of said ram assembly rotates said main frame and hence said implement around the pivotal connection between said hitch assembly and said pivot frame, and spring means also operatively extending between said hitch frame and said pivot frame whereby said implement is in floating relationship with said hitch assembly.

13. A pull-type field working farm implement comprising in combination a main frame, a working implement mounted on the main frame and arranged such that the main frame and implement are movable from a field position to a transport position and vice versa, a pivot frame pivotally connected to said main frame, a hitch assembly extending from said pivot frame and being pivotally connected thereto for movement in a vertical plane, means to detachably lock said pivot frame to said main frame when in the field position, said pivot frame swinging substantially horizontally through approximately 90° when said means to detachably lock said pivot frame released, a main wheel, and axle means on which said wheel is journalled for rotation about an axis, said axle means being fixed to said pivot frame at a position remote from the pivotal connection thereof to said main frame and such that in the field position the wheel is positioned at the rear of said main frame and working implement to support said main frame, whereby the rotation of the pivot frame through said 90° causes the axle means to turn through 90° and to move the wheel so as to take up a position in the transport position at the front of the main frame and intermediate the width of the implement.

14. The assembly according to claim 13 in which said main frame includes a substantially horizontal main member and a vertical hinge member at one end thereof, said pivot frame including a substantially vertical rectangular frame component, vertically situated hinges connected at one end of said frame component hingedly connecting to said vertical hinge member of said main frame around a substantially vetical axis, said vertical frame component including a pair of spaced and parallel substantially vertical members, bearing means within the lower ends of said members, said hitch assembly being pivotally connected to said bearing means.

15. The assembly according to claim 14 in which said means to detachably lock said pivot frame to said main frame in a field position includes a lock pin operatively connectable between said horizontal main member and said vertical frame component.

16. The assembly according to claim 13 in which said axle means to mount said main wheel to said pivot frame includes a spindle, said spindle having a support portion extending horizontally from said pivot frame and a wheel mounting portion angulated with respect to said support portion, said main wheel being journalled for rotation upon said wheel mounting portion, said support portion being selectively rotatable within said main frame through approximately 90° from a main wheel cambered position to a main wheel toed-out position and vice versa and means to selectively lock said spindle in either said positions.

17. The assembly according to claims 13, 14 or 15 includes a ram assembly operatively connected between said hitch assembly and said pivot frame whereby, when said assembly is in the field position, extension and retraction of said ram assembly rotates said main frame and hence said implement around the pivotal connection between said hitch assembly and said pivot frame, and spring means also operatively extending between said hitch frame and said pivot frame whereby said implement is in floating relationship with said hitch assembly.

18. The assembly according to claim 16, includes a ram assembly operatively connected between said hitch assembly and said pivot frame whereby, when said assembly is in the field position, extension and retraction of said ram assembly rotates said main frame and hence said implement around the pivotal connection between said hitch assembly and said pivot frame, and spring means also operatively extending between said hitch frame and said pivot frame whereby said implement is in floating relationship with said hitch assembly.

* * * * *